Oct. 6, 1942.                S. FEINGOLD                2,298,003
APPARATUS FOR CONVERTING DIRECT CURRENT INTO ALTERNATING CURRENT.
Filed June 14, 1939
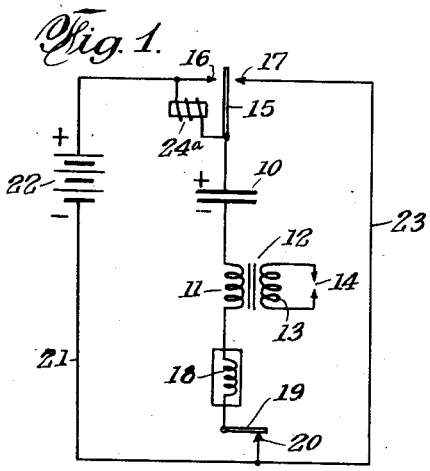
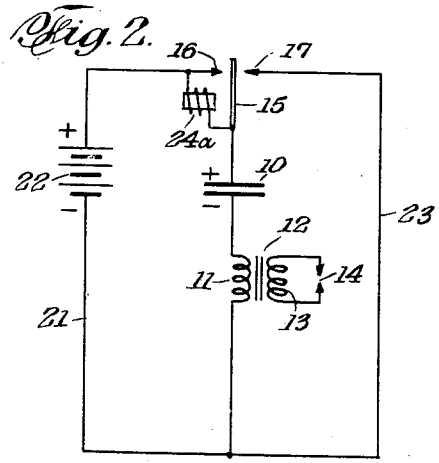
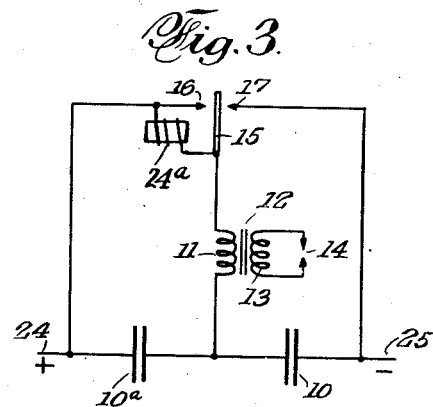
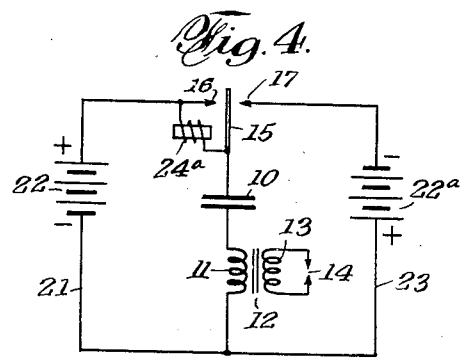
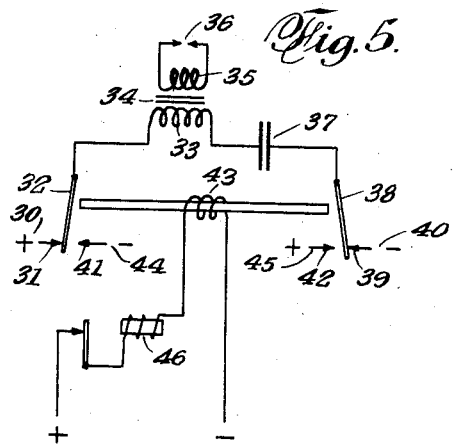
INVENTOR
SAMUEL FEINGOLD
BY
Hyman Jackman
ATTORNEY Patented Oct. 6, 1942

2,298,003

UNITED STATES PATENT OFFICE 2,298,003

APPARATUS FOR CONVERTING DIRECT CURRENT INTO ALTERNATING CURRENT

Samuel Feingold, Brooklyn, N. Y.

Application June 14, 1939, Serial No. 279,114

8 Claims. (Cl. 175—365)

This invention relates to improvements in direct current intermittently operated electrical devices and deals more particularly with devices for converting direct current into alternating current and operating a load with the converted current.

This application is a continuation in part of my application Serial No. 197,834.

The present application contemplates electrical and electro-mechanical apparatus in which a condenser is charged and discharged through a load as for instance an inert gas tube, it being further contemplated to employ a plurality of condensers for this purpose which charge and discharge alternately through the load.

More particularly, the invention seeks to provide apparatus of the indicated type in which undue sparking is eliminated; in which the resultant erosion of contacts is obviated; in which a good sine wave is obtained, and which may have universal use in many fields of application.

When a condenser is charged from a D. C. source, one plate will be positive and the other negative. If now the polarity of the source be reversed, that is the positive of the source is presented to the negative of the charged condenser, and the negative of the source is applied to the positive of the charged condenser, the condenser will discharge through the source and be charged by the source to the opposite potential. A device in series with such a condenser would have current flowing first in one direction, and then in the other direction, with each reversal of the potential.

If a combination of resistance and inductance is connected in series with a condenser, and a direct current voltage applied, the condenser will charge up to the voltage of the source, and the current will perform work in the resistance and set up a varying flux in the inductance. After a short period of time, depending upon the values of R, L and C, the direct current will cease to flow in the circuit, and the condenser will have reached its maximum state of charge. The circuit may now be opened and since there is no current flowing in the circuit, there will be no collapsing flux in the inductance. There is, therefore, no sparking at the break. While the current was charging the condenser, the flux in the inductance, beginning at zero, has reached maximum. As the charge continues to build up the flux falls to minimum. There is thus generated a half cycle of alternating current. If the two ends of the circuit are disconnected from the battery and short circuited, the condenser will discharge through the resistance and inductance in the opposite direction, and in so doing will cause a sine wave of flux in the inductance but opposite in phase to the previous flux. This also will generate a half cycle, so that a complete charge and discharge will generate a complete cycle of flux. If the inductance were a transformer, a complete cycle of sine wave current will flow in the secondary. A load across the straight inductance will be operated by a complete sine wave cycle of current.

It is possible to arrange a number of condensers and inductances so that the inductances will have both charging and discharging currents at the same time. This also occurs when either wholly charging or wholly discharging.

Another adaptation of these principles makes use of batteries, which while charging or discharging the condensers, will produce higher voltage in the circuit.

Still another development makes use of a vibrator either mechanical or electronic, which will generate trains of harmonies or high frequencies.

The accompanying drawing illustrates several forms of apparatus employing the above principles, said drawing forming the basis of the following detailed specification.

In the drawing:

Fig. 1 is a diagrammatic view of apparatus in which a load is operated by the alternate charging and discharging of a condenser, a vibrator being employed to produce high frequency trains.

Fig. 2 diagrammatically illustrates a similar device in which the vibrator is omitted.

Fig. 3 illustrates apparatus employing two condensers, the charging of one aiding the discharge of the other alternately.

Fig. 4 shows a device having two batteries arranged so that the voltage across the inductance is twice that of one battery.

Fig. 5 shows a device in which double voltage across the load is obtained with one battery.

Referring now to the drawing, Fig. 1 shows an inverter wherein the charging of the condenser operates a load in one direction and the discharge thereof operates the load in the other direction. If the load is a transformer, the primary coil thereof will be energized by two equal and opposite currents alternately and successively. These currents, for practical purposes, may be termed sine wave currents, and accordingly give rise to sine wave currents in the secondary of the transformer.

In the apparatus illustrated, 10 represents a condenser having connection with the primary 11 of a transformer 12, the secondary 13 of said transformer being connected to a load device such as an inert gas tube 14. The other side of the condenser is preferably connected to an armature 15 associated with the respective contacts 16 and 17. A vibrator 18, having an armature 19 associated with the contact 20 is connected in series with the condenser and transformer primary by means of the conductor 21 with a source of electric current such as the battery 22. The contact 16 is also connected to said battery but at the opposite potential thereof. A connection is also made at 23 between the contact 17 and the contact 20. A conventional form of armature vibrator driving coil is indicated at 24a.

The apparatus shown in Fig. 2 is substantially similar to that above described with the exception that the vibrator 18 and its armature 19 and contact 20, have been omitted.

Referring more particularly to Fig. 2, the charging of the condenser 10 energizes the load represented by the primary 11 of the transformer 12. This energization is in one direction and the discharge of the condenser will energize said load in the other direction. When the armature 15 rests against the contact 16, the battery 22 will charge the condenser 10 through the load 11. When said armature rests against the contact 17, the condenser discharges through the load and in so doing, sets up a current in a direction opposite to that established during the charge of the condenser. Alternating current is therefore applied to the primary of the transformer, resulting in a similar induced current in the secondary 13.

In Fig. 1 the vibrator 18 is arranged in a circuit so that while charging and discharging of the condenser occurs, it may operate to break up the said charging and discharging current. This generates a train of oscillations. The vibrator 18 may be either mechanical or electronic and may be interposed in series with the load if it is desired to generate oscillations of higher frequency. During the operation, the coil in the vibrator will attract the armature 19 away from the contact 20 to break the circuit both in the charging and discharging phase of the operation. The above stated train of oscillations will thus be provided.

Fig. 3 shows another type of inverter wherein two condensers 10 and 10a are employed, the charging current of one aiding the discharging current of the other during the operation of the device. 24 and 25 represent the terminals of a D. C. supply. When the armature 15 rests against the contact 16, current flows from the positive terminal 24, to the contact 16, armature 15, primary 11 of the transformer 12, and condenser 10 to the negative terminal 25. The condenser is charged up through the primary 11 and the core of the transformer is subjected to a flux in one direction. When the armature 15 rests against the contact 17, current flows from the positive terminal 24, to condenser 10a, coil 11, armature 15, and contact 17 to negative terminal 25. The current in the coil 11 now flows in the opposite direction. At the same time the condenser 10 discharges through the coil in the same direction, thus aiding the charging current. When the armature 15 falls again against the contact 16, current flowing from the terminal 24 and charging condenser 10, will be aided by the discharging of the condenser 10a. Thus an alternating flux is set up and an alternating current results at the output.

Fig. 4 shows a form of inverter utilizing two batteries in such a manner as to subject the load to twice the voltage of one of said batteries. These batteries are represented as 22 and 22a, the battery 22 being connected as shown in Fig. 2, and the battery 22a in the line 23 of said figure. The batteries 22 and 22a have their polarities reversed as shown and upon the application of current, the coil 24a which may be of high resistance, attracts the armature 15 to the contact 16. This causes current to flow from the positive terminal of the battery 22 to said contact, through the armature, through the condenser 10, and through the primary coil 11 to the negative terminal of the battery 22. When the armature rests against the contact 17, the current will flow from the positive terminal of the battery 22a, through the coil 11, into the condenser 10, and through the armature 15 and contact 17 to the negative terminal of said battery 22a. The condenser 10 will have impressed upon it an alternating current of a frequency dependent upon the rate of vibration of the armature 15. The load, represented by the transformer coil 11 will have impressed upon it the voltage of the condenser plus the voltage of the battery at each vibration.

It is not essential here to show the various methods for driving the vibrating armature. As explained in the mentioned earlier application, these armatures or reeds may be self-driven or driven from any external source. Also, although all armatures have been here shown as arranged midway between their contacts, such a condition is not necessarily essential, it being feasible to arrange to have the armature normally in contact with one of the contacts at the start of the operation.

Fig. 5 illustrates an inverter wherein although one battery is used, the load is, nevertheless, subjected to twice the battery voltage. As shown, the positive terminal 30 of a battery sends current through a contact 31, to an armature 32, the primary coil 33 of a transformer 34, said transformer having a secondary 35 connected with a load 36. The current flowing through the primary flows through the condenser 37, the armature 38 and the contact 39 to the negative terminal 40 of said battery. The condenser 37 had now impressed upon it the voltage of the battery. When the armatures 32 and 38 are attracted to the respective contacts 41 and 42 by the driving coil 43, current will flow through the primary coil 33 in the opposite direction, charging the condenser in the opposite manner. Said coil 33 has, therefore, had A. C. flowing through it and this results in induced A. C. in the secondary 35 of the transformer 34. Because the direction of the current has been changed, the voltage across the load is the sum of the condenser discharge voltage and the battery voltage, or twice the battery voltage. The driving coil 43 is shown as actuated by a separate vibrator 46 although it may be self-driven.

I claim:

1. Apparatus of the character described comprising a source of direct current, an armature, contacts associated with said armature and each connected to opposite sides of said current source, a condenser connected to said armature, a load connected to said condenser, and means in series with said load and with said source of current for generating oscillations in the circuit during the charge and discharge period of said condenser through said load.

2. Apparatus of the character described comprising a condenser and a load in series, two charging circuits for said condenser including two sources of direct current, an armature connected to the condenser and a pair of contacts associated with the armature, one of said contacts being connected to the positive terminal of one current source and the other contact being connected to the negative terminal of the other current source, said condenser being charged by said current sources alternately under control of said armature and its contacts.

3. In apparatus of the character described, a condenser and a load in series, a charging circuit for said condenser comprising a source of direct current, a contact and an armature in series with said condenser and load, and a second charging circuit for said condenser comprising a second source of direct current and a second contact in series with said armature and said condenser and load, the mentioned contacts each being connected to an opposite potential of its respective current source.

4. Apparatus of the character described comprising an electromagnetic device having a pair of armature switches each being arranged to alternately connect with a positive and negative terminal of a source of direct current, a coil for said device, means for inducing pulsating current in said coil, a condenser in series with said switches, and a load in series with said condenser for receiving the discharge thereof under the control of said switches.

5. Apparatus of the character described comprising a source of direct current, an armature, a condenser, a load device, and an oscillation generating device in series with said direct current source, a contact connected to one side of said current source and associated with said armature to form a charging circuit for said condenser, and a second contact associated with said armature and connected to the other side of said current source to form a discharging circuit for said condenser, said oscillation generating device producing a train of oscillation in both the charging and discharging circuits.

6. Apparatus of the character described comprising a source of direct current, an armature, a condenser, a load device, and an oscillation generating device in series with said direct current source, a contact connected to one side of said current source and associated with said armature to form a charging circuit for said condenser, and a second contact associated with said armature and connected to the other side of said current source to form a discharging circuit for said condenser, said oscillation generating device producing a train of oscillation in both the charging and discharging circuits, said latter device comprising a vibrator including a coil, an armature and a contact therefor.

7. Apparatus of the character described comprising a condenser and a load in series, two charging circuits for said condenser including two sources of direct current, an armature connected to the condenser and a pair of contacts associated with the armature, one of said contacts being connected to the positive terminal of one current source and the other contact being connected to the negative terminal of the other current source, said condenser being charged by said current sources alternately under control of said armature and its contacts and simultaneously discharged through the load during each of the charging periods.

8. Apparatus of the character described comprising an electromagnetic device having a pair of armature switches each being arranged to alternately connect with a positive and negative terminal of a source of direct current, a condenser and a load connected in series with said switches, a coil for said electromagnetic device, and means for inducing pulsating current in said coil, said switches being movable by said electromagnetic device to form a charging circuit and a simultaneous discharging circuit in one direction for said condenser and to form an alternate charging circuit and a simultaneous discharging circuit for said condenser in the opposite direction.

SAMUEL FEINGOLD.